Figure 1:
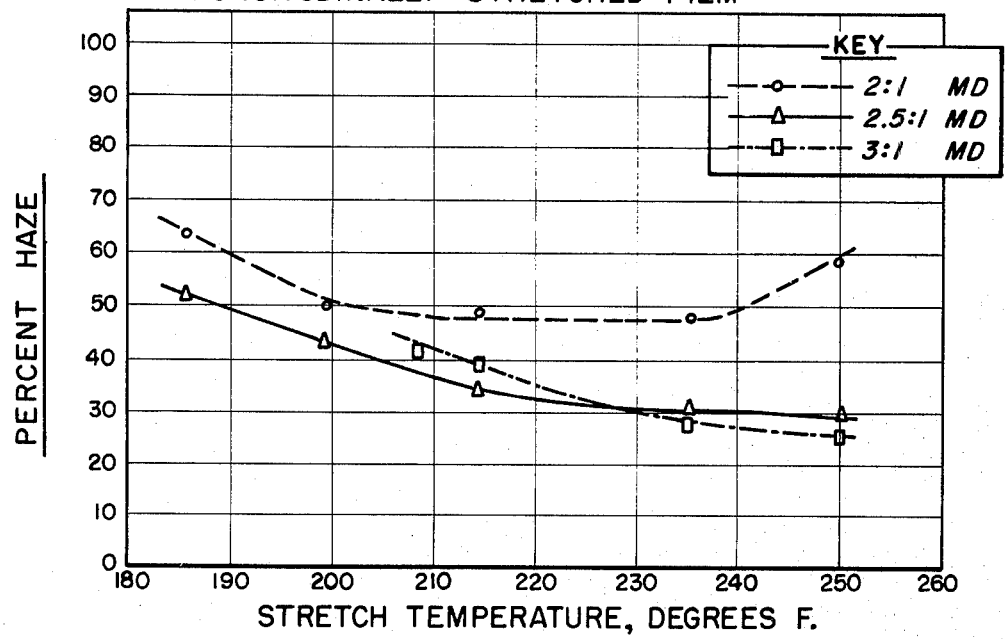

United States Patent [19]

Watts

[11] 4,076,769

[45] Feb. 28, 1978

[54] ABS FILMS

[75] Inventor: William A. Watts, Akron, Ohio

[73] Assignee: The Goodyear Tire & Rubber Company, Akron, Ohio

[21] Appl. No.: 649,384

[22] Filed: Jan. 15, 1976

Related U.S. Application Data

[63] Continuation-in-part of Ser. No. 448,088, Mar. 4, 1974, abandoned.

[51] Int. Cl.² .................... C08L 9/02; C08L 25/04
[52] U.S. Cl. .......................... 260/893; 260/4 AR; 260/876 R; 260/880 R; 264/289
[58] Field of Search ............ 260/5, 4, 887, 893, 260/879, 888, 896, 880 R, 892, 901, 876 R; 264/289

[56] References Cited

U.S. PATENT DOCUMENTS

| 2,802,808 | 8/1957 | Hayes | 260/893 |
|---|---|---|---|
| 3,407,253 | 10/1968 | Yoshimura et al. | 264/289 |
| 3,629,387 | 12/1971 | Watanabe et al. | 264/289 |
| 3,928,099 | 12/1975 | Ohotsubo et al. | 264/289 |

Primary Examiner—J. Ziegler
Attorney, Agent, or Firm—J. M. Wallace, Jr.; Gordon C. Mack

[57] ABSTRACT

The invention relates to an oriented film of ABS composition comprised of a resin and a rubber phase, which film exhibits little or no haze, does not stress- or crease-whiten, and has improved low-temperature impact properties. The film is oriented at a temperature below the glass transition temperature of the resin phase. It is preferably biaxially oriented.

8 Claims, 2 Drawing Figures

ABS FILMS

This is a continuation-in-part of my application Ser. No. 448,088 filed Mar. 4, 1974, being abandoned.

PRIOR ART

Hayes, U.S. Pat. No. 2,802,808 describes ABS film containing 5 to 25 percent of a graft copolymer of (1) a styrene-acrylonitrile-type mixture of monomers upon a butadiene-type hydrocarbon rubber (column 2, lines 20–22) and (2) 95 to 75 percent of styreneacrylonitrile-type resin (column 6, lines 49–54) which can be blown to form a thin, flexible wrapping material. Neither the film nor its properties nor the stretching temperature are described.

THE INVENTION

The ABS film of this invention is an oriented film of improved properties. It exhibits little or no haze and will not stress- or crease-whiten. It has improved low-temperature impact properties. These properties are present due to the composition of the film and the control of the amount the film is stretched and the stretch temperature during orientation.

ABS resins have been known commercially as moldable plastics and are described in the literature. The only film which has been described, as far as applicant is aware, is the film described in the Hayes patent, cited above.

The ABS resin which is usually employed commercially is composed of rubber phase, usually a butadiene-containing elastomer, dispersed in a continuous resin phase of a styrene-acrylonitrile (SAN) resin. The compositions of the two components and the proportions in which they are used may vary. The rubber phase is usually a copolymer produced by grafting acrylonitrile and styrene onto a polybutadiene backbone. Generally the composition, by weight percent, is butadiene (60–90)/styrene (25–5)/acrylonitrile (15–5). Butadiene acrylonitrile copolymer (nitrile rubber) has also been used as the copolymer in which the weight-percent composition generally is butadiene (60–90)/acrylonitrile (40–10). The composition of the thermoplastic resin varies but is generally styrene (60–90)/acrylonitrile (40–10) by weight percent. Generally the ABS will be composed of elastomer (5–55)/resin (95–45 percent). It must be understood that each component may comprise a relatively minor amount of other reacted monomer, as well as plasticizers, antioxidants, fillers, lubricants, etc.

The elastomer phase may be essentially natural rubber or a butadiene-containing synthetic rubber which may be, in addition to butadiene-styrene-acrylonitrile terpolymer, butadiene-acrylonitrile copolymer, etc. The resin phase may be styrene-methyl methacrylate, styrene-acrylonitrile, or styrene-acrylonitrile-methyl methacrylate, etc., copolymers which are characterized by glass transition temperatures of 70°–120° C. Glass transition temperatures referred to herein are determined by differential thermal analysis (DTA) techniques.

The films of this invention are substantially 0.5 to 2 mils thick and are usually produced by stretching film which is substantially 2 to 20 mils thick. They may be oriented to about 2 to about 36 times their original area by orienting biaxially (either by simultaneous or successive stretching in the machine and transverse directions) or by post bubble or other radial orientation methods.

Unless oriented at the controlled temperature disclosed herein ABS films whether oriented by cast-extrusion or melt-extrusion or by bubble extrusion, have several undesirable properties, namely, they are hazy, they crease- or stress-whiten when creased at 90° or 180° or by wrinkling, and they have poor low-temperature impact properties. Light transmission through the whitened areas is virtually eliminated, thereby adversely affecting consumer appeal which is directed toward transparent packaging materials which permits inspection of both the packaged goods and advertising matter etc., displayed within the package.

Also ABS films not produced by orientation under the controlled conditions disclosed herein, have poor low-temperature impact resistance. To some extent this can be slightly changed by varying the rubber-to-resin ratio in the ABS resin.

ABS film which is oriented as disclosed herein has a haze in the range of zero to substantially 25 percent measured according to ASTM method D-1003. Substantially no visual crease-whitening or stress-whitening is produced by a 90° fold, 180° fold, wrinkling or simple stretching. The film has a brittle temperature which is at least twice as low as the unoriented film of the same composition, as measured by ASTM method D-1790, and may be as much as 5 or even 10 or more times lower.

It is believed that if the orientation temperature is not controlled, the continuous resin phase composed essentially of styrene copolymers, softens or melts and therefore partially flows more or less completely with the non-continuous rubber phase causing no significant change in the rubber-resin interface thickness. This produces and it may be the cause of haze, the whitening by creasing or stressing and also the poor low temperature properties of the film when not produced as disclosed herein. To reduce or prevent this, the film of this invention is oriented at a temperature below the glass transition temperature of the resin phase which generally is preferably about 10° F. below the glass transition point. The extent to which the film can be stretched will depend upon its composition but, generally speaking, it can be oriented to increase its area to substantially 2 to 36 times its unoriented area. This is preferably done by biaxially stretching the film, by stretching it first in one direction to increase its length by 50 to 600 percent and then in the transverse direction to increase its width by 50 to 600 percent, or it may be stretched in both directions simultaneously.

In the practice of this invention, the unstretched ABS composite is subjected to biaxial orientation in a gas medium, or in a liquid medium. The orientation may be effected in a single step or several steps. For example, the orientation of the ABS composite by biaxially stretching may be simultaneously performed as by an inflation (or bubble) method or, alternatively, as by a tenter-frame method. Additionally, orientation of the ABS composite by biaxially stretching may be accomplished by first stretching the ABS composite in the machine direction, or longitudinal direction as removed from the production equipment (calender, extruder, or solution casting units, etc.), and then stretching in a substantially transverse direction. Generally, the stretched area to unstretched area ratio of the improved ABS composite is in the range of 2.0 to 36.0, but, preferably in the range of 4.0 to 30.0 and most preferably 4.0 to 12.0.

Practical embodiments of this invention are discussed and illustrated in the following examples. All parts are given by weight percent.

EXAMPLE 1

An attempt was made to produce a suitable packaging film using conventional extrusion techniques.

A copolymer blend A consisting of 78 percent by weight styrene/acrylonitrile (70–30) resin and 22 percent by weight, butadiene/acrylonitrile/divinyl benzene (75–25–.3) polymer and a graft copolymer blend B consisting of 78.3 percent by weight styrene/acrylonitrile (70–30) resin and 21.7 percent by weight butadiene/styrene/acrylonitrile (78.3/13.84/7.86) graft copolymer were both flat die extruded using a 20-mil lip slot die attached to a 1½ inch diameter, 20:1 L/D extruder and a melt temperature of 384°–396° F. to produce a 1-mil film.

The resultant 1-mil films of copolymer blend A and graft copolymer blend B yielded the following physical properties (see Table I).

TABLE I
PHYSICAL PROPERTIES OF FLAT-DIE-EXTRUDED ABS FILM

| | COPOLYMER BLEND A | GRAFT COPOLYMER BLEND B |
|---|---|---|
| Per Cent Haze[1] | | |
| Control Film[2] | 81.7 | 80.6 |
| Creased Film[3] | 100.0 | 100.0 |
| Masland Impact, $T_b$ ° F.[4] | +5 | −10 |

[1]Determined using the Gardner Hazemeter, as per ASTM-D-1003.
[2]Control film - as extruded, no external stress applied.
[3]Creased film - 180° folds in the film.
[4]$T_b$ = brittle temperature where 50 per cent of the samples failed. Determined according to ASTM-D-1790.

Although the flat die extrusion process involves stretching (approximately 20:1) of the polymer mass in the melt stage (above $T_g$ – 384°–396° F.), the data in Table II indicate that the stretching is not adequate to produce a film which is satisfactory for conventional packaging applications requiring product identification and display. This type of orientation in which a molten mass of the ABS composition is drawn from a slot die at 384°–396° F. at a thickness of 20 mils to a thickness of 1 mil is usual in the production of thin films by melt extrusion, thereby not significantly affecting the rubber-resin interface. Therefore, the extruded film has high haze, crease-whitening and has poor low temperature impact properties.

EXAMPLE 2

A study was then initiated to determine the effect of bubble extrusion on the transparency, crease- or stress-whitenability, and low temperature impact resistance of ABS films.

A copolymer blend A consisting of 78 percent by weight 70/30, styrene/acrylonitrile (70–30) resin and 22 percent by weight butadiene/acrylonitrile/divinyl benzene (75/25/.3) polymer and a graft copolymer blend B consisting of 78.3 percent by weight styrene/acrylonitrile (70–30) resin and 21.7 percent by weight of butadiene/styrene/acrylonitrile (78.3/13.84/7.86) graft copolymer were bubble-extruded using an 18-mil circular die attached to a 1½ inch diameter, 20:1 L/D extruder and a melt temperature of 380°–385° F. to produce a 1-mil film.

Even though a blow-up ratio of 3:1 was achieved, the resultant 1-mil films of copolymer blend A and graft copolymer blend B still exhibited a high level of haze and crease- or stress-whitened because the orientation achieved was done above the glass transition temperature of the resin phase (approximately 382° F.).

EXAMPLE 3

With the same objective in mind (to produce a transparent ABS film with improved low temperature impact properties which will not crease- or stress-whiten), additional studies were conducted using 5-mil copolymer blend A and graft copolymer blend B sheet stock (of the compositions given in Example 2) produced via flat die extrusion according to the conditions in Example 1.

Using a radial arm stretch apparatus mounted in a laboratory circulating hot-air oven, the extruded films were stretched biaxially 2:1 and 3:1 at temperatures from 150° F. to 275° F. It was determined that a stretch temperature of 230°–250° F. at both stretch ratios was required to visually improve clarity and reduce the tendency of the film to crease-whiten. These results suggested that additional studies were warranted.

Since the copolymer blend ABS resins (such as copolymer blend A described in Example 1) generally exhibit physical properties (tensile, tear and impact) inferior to the graft copolymer blend ABS resins (such as graft copolymer blend B), subsequent studies were conducted using the graft copolymer blend B.

EXAMPLE 4

Approximately 100 pounds of graft copolymer blend B (78.3 percent by weight styrene/acrylonitrile (70–30) resin and 21.7 percent by weight butadiene/styrene/acrylonitrile (78.3/13.84/7.86) graft copolymer) was flat die-extruded under the conditions given in Example 1 to produce approximately 2-mil film for uniaxial orientation studies using a Butterworth orientation machine.

Table II shows the effect of uniaxial orientation of such uniaxially oriented film on the percent haze, stress-whitenability, and brittle temperature of the graft copolymer blend ABS film.

TABLE II
Effect of Uniaxial Orientation on Selected Physical Properties

| Sample | Stretch Ratio | Temp. ° F. | Gauge (Inches) | Per cent Haze[1] | Stress Whitens | Brittle Temp. ° F.[2] |
|---|---|---|---|---|---|---|
| A | — | — | .001 | 80.5 | yes | −10 |
| B | | | .005 | 81.0 | yes | −10 |
| C | | | .010 | 81.5 | yes | −10 |
| D | 2:1 | 168 | | temperature too low to orient | | |
| E | 2:1 | 185 | .0009 | 64.0 | yes* | — |
| F | 2:1 | 200 | .0009 | 48.0 | yes* | — |
| G | 2:1 | 215 | .0009 | 48.0 | yes* | — |
| H | 2:1 | 235 | .0009 | 46.0 | yes* | −10 |
| I | 2:1 | 250 | .0009 | 61.0 | yes* | — |
| J | 2:1 | 265 | | temperature too hot to orient | | |
| K | 2.5:1 | 168 | | temperature too low to (A, | | |
| L | 2.5:1 | 185 | .0007 | 52.0 | yes* | — |
| M | 2.5:1 | 200 | .0007 | 42.0 | yes* | — |
| N | 2.5:1 | 215 | .0007 | 34.0 | yes* | — |
| O | 2.5:1 | 235 | .0007 | 32.0 | yes* | −10 |
| P | 2.5:1 | 250 | .0007 | 30.0 | yes* | — |
| Q | 2.5:1 | 265 | | temperature too hot to orient | | |
| R | 3:1 | 185 | | temperature too low to orient | | |
| S | 3:1 | 200 | | temperature too low to orient | | |
| T | 3:1 | 207 | .0005 | 44 | yes* | — |
| U | 3:1 | 215 | .0005 | 38 | yes* | — |
| V | 3:1 | 235 | .0005 | 30 | yes* | −10 |
| W | 3:1 | 250 | .0005 | 28 | yes* | — |
| X | 3:1 | 265 | | temperature too | | |

TABLE II-continued

Effect of Uniaxial Orientation on Selected Physical Properties

| Sample | Stretch Ratio | Temp. °F. | Gauge (Inches) | Per cent Haze[1] | Stress Whitens | Brittle Temp. °F.[2] |
|---|---|---|---|---|---|---| low to orient

[1]Per cent haze - determined using the Gardner Hazemeter, as per ASTM-D-1003
[2]Brittle temperature at which 50 per cent of the samples failed. Determined according to ASTM-D-1790.
*Stress whitens when creased but not as badly as the control films (A, B and C).

FIG. 1 shows the optimum orientation temperature range for three stretch ratios. For example, at a 2:1 stretch ratio, the optimum orientation temperature range from the curve (plateau) is 210° F. to 235° F. Furthermore, FIG. 1 reveals the effect of processing temperature on one physical property, namely, percent haze.

The cumulative data in Table II indicates that:
1. to significantly reduce haze, the uniaxial orientation temperature is critical;
2. the resultant uniaxially oriented film still stress-whitens, but not as severely as the control films; and
3. the brittle temperature remains unchanged.

These results indicate that uniaxial orientation at temperatures below the glass transition temperature of the resin phase (220° F.) is not completely sufficient to cause enough change in the rubber-resin interface to observe an improvement in non-crease whitening and low temperature impact properties.

EXAMPLE 5

Approximately 100 pounds of graft copolymer blend B (78.3 percent by weight, styrene/acrylonitrile (70-30) resin (glass transition temperature of 220° F.) by weight of butadiene/styrene/acrylonitrile (78.3/13.84/7.86) graft copolymer) was flat die-extruded under the conditions given in Example 1 to produce approximately 6-mil film for biaxial orientation studies using a Butterworth orientation machine. Initially, the graft copolymer blend B film was uniaxially oriented under optimum conditions established in Example 4 to yield film Y (see Table III) for second-stage processing studies (two-stage biaxial orientation studies), which involve orientation of the film in the transverse direction.

Table III shows the effect of biaxial orientation on the percent haze, stress-whitenability, and brittle temperature of the graft copolymer blend ABS film.

Results in Table III show that samples AA, BB, FF, II, MM and RR have haze in the range of zero to substantially 25 percent, no crease whitening and greatly improved low temperature impact properties as compared to sample A the control or Sample Y the uniaxially stretched control.

TABLE III

Effect of Biaxial Orientation on Selected Physical Properties

| Sample | Stretch Ratio | Temp. °F. | Gauge (Inches) | Per cent Haze[1] | Stress Whitens | Brittle Temp. °F.[2] |
|---|---|---|---|---|---|---|
| A | — | — | .001 | 80.5 | yes* | −10 |
| Y | 3:1 MD | 235 | .002 | 37.5 | yes[3] | −10 |
| AA | 3:1 MD/2:1 TD | 235/185 | .0009 | 20.0 | no | −100 |
| BB | 3:1 MD/2:1 TD | 235/200 | .0009 | 27.0 | no | −100 |
| CC | 3:1 MD/2:1 TD | 235/225 | .0009 | 38.0 | yes[3] | _[4] |
| DD | 3:1 MD/2:1 TD | 235/250 | .0009 | 76.0 | yes | _[4] |
| EE | 3:1 MD/2.5:1 TD | 235/180 | .0007 | 25.0 | no | _[4] |
| FF | 3:1 MD/2.5:1 TD | 235/200 | .0007 | 21.0 | no | −100 |
| GG | 3:1 MD/2.5:1 TD | 235/225 | .0007 | 36.0 | yes[3] | _[4] |
| HH | 3:1 MD/2.5:1 TD | 235/250 | .0007 | 70.0 | yes | _[4] |
| II | 3:1 MD/3:1 TD | 235/200 | .0005 | 18.0 | no | −100 |
| JJ | 3:1 MD/3:1 TD | 235/225 | .0005 | 39.0 | yes[3] | _[4] |
| KK | 3:1 MD/3:1 TD | 235/250 | .0005 | 72.0 | yes | _[4] |
| LL | 3:1 MD/3.5:1 TD | 235/190 | .0004 | 15.0 | no | _[4] |
| MM | 3:1 MD/3.5:1 TD | 235/200 | .0004 | 17.0 | no | −100 |
| NN | 3:1 MD/3.5:1 TD | 235/215 | .0004 | 22.0 | no | _[4] |
| OO | 3:1 MD/3.5:1 TD | 235/225 | .0004 | 46 | yes[3] | _[4] |
| PP | 3:1 MD/3.5:1 TD | 235/250 | .0004 | 69 | yes | _[4] |
| QQ | 3:1 MD/4:1 TD | 235/170 | .0003 | 17 | no | _[4] |
| RR | 3:1 MD/4:1 TD | 235/180 | .0003 | 17 | no | −100 |
| SS | 3:1 MD/4:1 TD | 235/190 | .0003 | 18 | no | _[4] |
| TT | 3:1 MD/4:1 TD | 235/200 | .0003 | 19 | no | _[4] |
| UU | 3:1 MD/4:1 TD | 235/215 | .0003 | 39 | yes[3] | _[4] |
| VV | 3:1 MD/4:1 TD | 235/225 | .0003 | 58 | yes | _[4] |

[1]Per cent haze - determined using the Gardner Hazemeter, as per ASTM-D-1003.
[2]Brittle temperature where 50 per cent of the samples failed. Determined according to ASTM-D-1790.
[3]Stress whitens but not as severely as the control film (A).
[4]Brittle temperature was not determined.

Figure 2:
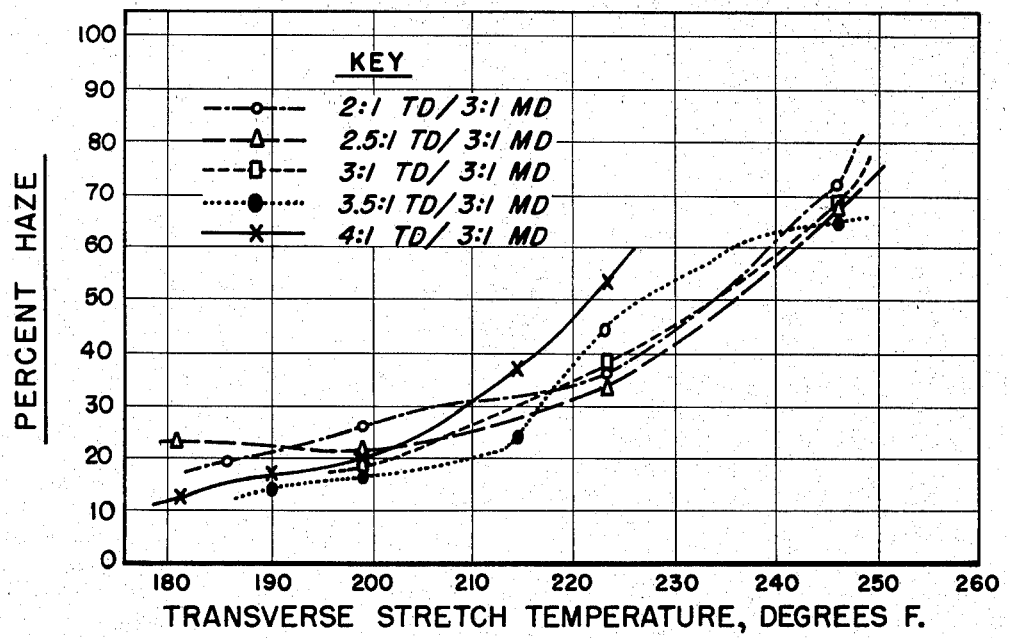

FIG. 2 shows the optimum orientation temperature range for various stretch ratios to achieve minimum percent haze (transparency), which also results in the elimination of crease- or stress-whitening and significant improvement in brittle temperature (see Table III).

EXAMPLE 6

To demonstrate the efficacy of the method disclosed to improve transparency, eliminate stress-whitening, and improve low temperature impact properties, additional studies were conducted using the following commercially available ABS resins:
1. Cycolac LE, Natural 1000 from Borg Warner Corporation;
2. Cyclolac AE, Natural 1000 from Borg Warner Corporation;
3. Lustran 761, 1000 Natural from Monsanto;
4. Lustran 461, 1000 Natural from Monsanto.

Each of the commercially available ABS resins was flat die extruded under conditions similar to the conditions given in Example 1 to produce film for biaxial orientation studies using a Butterworth orientation machine. These films were then biaxially oriented via a two-step process using the optimum conditions established in Example 4 and Example 5.

Through biaxial orientation at specific temperatures and ratios, film produced from commercially available ABS resins have improved transparency (reduced haze), do not stress-whiten, and have improved low temperature impact properties.

The use of specific temperatures and stretch ratios of 2 to 36 times, to orient ABS film to reduce haze (improve transparency), reduce or eliminate stress-whitening, and improve low temperature impact properties represents a significant and unexpected advance in the state of the art. The disclosed technology can be used to produce ABS films for numerous packaging applications, heretofore not considered real market outlets due to the disadvantages of conventional ABS film stock.

While certain representative embodiments and details have been shown for the purpose of illustrating the invention, it will be apparent to those skilled in this art that various changes and modifications may be made therein without departing from the spirit or scope of the invention.

I claim:

1. An ABS film substantially 0.5 to 2 mils thick composed of a rubber phase of natural rubber or butadiene-containing rubber dispersed in a continuous phase of a resin composed essentially of styrene-containing copolymer, which film has been biaxially stretched to the unoriented ABS film to 2 to 36 times the area of the unoriented film, which film has a haze of no more than substantially zero to 25 measured according to ASTM method D-1003 and is substantially free from whitening when stressed or creased.

2. The film of claim 1 which has a brittle temperature of at least two times lower than the unoriented film of the same composition according to ASTM-method D-1790.

3. The film of claim 2 in which the continuous phase is composed essentially of styrene-acrylonitrile, styrene-acrylonitrile-methyl methacrylate or styrene-methyl methacrylate copolymer.

4. The film of claim 1 which is stretched to substantially 4 to 30 times its unoriented area.

5. The method of producing film from a composite of butadiene-containing rubber dispersed in a continuous phase of a resin composed essentially of styrene and acrylonitrile, which comprises biaxially orienting the composite to from 2 to 36 times its unoriented area at a temperature lower than what is substantially the glass transition temperature of the resin phase.

6. The method of claim 4 in which the orientation is by biaxial stretching to about 50 to 600 percent in one direction and correspondingly stretching in a substantially transverse direction about 50 to 600 percent.

7. The method of preparing a film of an ABS composite comprised of a continuous styrene-containing resin phase and a rubber phase dispersed therein, characterized by having a haze in the range of substantially zero to about 25 percent according to ASTM method D-1003, substantially no visual stress or crease-whitening caused by a 180° fold, and a brittle temperature of at least two times lower than the unoriented film of the same composition according to ASTM method D-1790, which method comprises orienting said film by biaxially stretching at a temperature which is below the glass transition temperature of said resin phase.

8. The method of claim 7 in which the film is stretched to substantially 4 to 30 times its unoriented area.

* * * * *